Oct. 4, 1960     J. M. STOGNER ET AL     2,954,961

HIGH PRESSURE PLUG VALVES WITH INSERT

Filed Oct. 23, 1959

INVENTORS.
JOEL M. STOGNER,
LEONARD D. HALE,
BY   JACK C. McGUIRE,

*Earl Babcock.*

ATTORNEY.

United States Patent Office 2,954,961
Patented Oct. 4, 1960

2,954,961

HIGH PRESSURE PLUG VALVES WITH INSERT

Joel M. Stogner, Leonard D. Hale, and Jack C. McGuire, all of Duncan, Okla., assignors to Halliburton Oil Well Cementing Company, Duncan, Okla., a corporation of Delaware Filed Oct. 23, 1959, Ser. No. 848,451

2 Claims. (Cl. 251—312)

This invention relates to plug valves adapted for use in controlling flow of fluids under high pressure.

The present invention is an improvement on the plug valves disclosed in the United States patent to Stogner 2,813,695, granted November 19, 1957 and the United States patent to Owsley No. 2,911,187, granted November 3, 1959.

As explained in the Stogner patent cited, the valve body of a cylindrical plug valve may be provided with a tapered insert which is diagonally split and so arranged as to yield slightly in response to certain forces and provide an intimate sealing contact with the plug.

The valve of the Stogner patent, with the improvement of the Owsley patent, has met with marked commercial success.

However, since the valve body of the original Stogner design has a tapered bore for the tapered insert, it had a certain disadvantage. When fluid under high pressure filled the void spaces of the valve, a downward force was exerted on the insert due to the differential area between its large and small ends. Since the insert had a flange engaging the plug, this downward force was transmitted to the plug, and it tended to move the insert and plug down into the tapered bore of the valve body.

It is a known fact that a valve body will expand as pressure is applied internally. When this happened with the original Stogner design, the insert and plug moved downwardly into the tapered bore due to the force described above. Then when the internal pressure was released, the valve body contracted and gripped the plug and insert much tighter than initially and resulted in higher operating torque being required to turn the plug. In some cases the valve even became inoperative due to this "freezing."

The present invention overcomes the disadvantage of the original Stogner valve. Instead of causing the flange on the insert to rest upon the plug, it is projected into a groove in the threaded cap on the valve body, so that the insert is supported against downward movement by the valve body itself. Since the cap is threaded, the vertical position of the insert can be adjusted by manipulation of the cap.

The objects of the invention will be more apparent from consideration of the following description taken in connection with the accompanying drawings in which.

Figure 1:
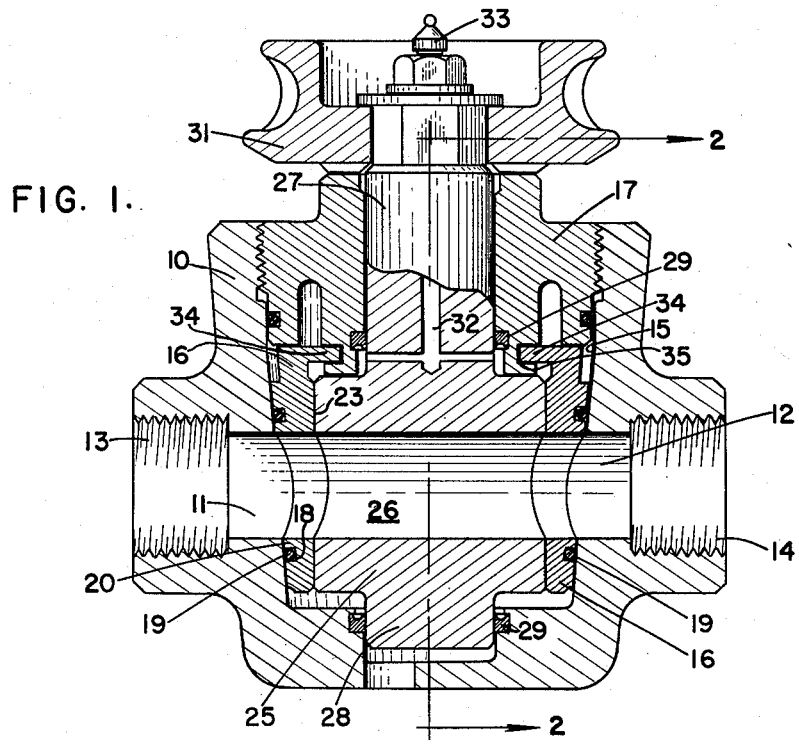
Figure 1 is a vertical cross-sectional view of a valve constructed in accordance with the principles of the invention.

Referring to the drawings in detail, it will be seen that a valve body is shown at 10, the body being provided with inlet and outlet passageways 11 and 12. Fluid may flow through the valve in either direction and the structure of the inlet and outlet passageways 11 and 12, as well as the associated parts, may be the same. For purposes of description it may be assumed that the passageway 11 is the inlet and the passageway 12 is the outlet of the valve body. The valve body may be threaded as illustrated at 13 and 14 to make connections with pipe or other suitable conduit.

It will be seen that the valve body 10 is provided with a tapered bore 15 at right angles to the passageways 11 and 12. Within this tapered bore there is an insert 16 housing a cylindrical plug 25. As shown in Figure 4 of Stogner Patent 2,813,695, this insert 16 is split longitudinally so as to provide two sections. The plug 25 has an ordinary bore 26.

The insert 16 has an outer tapered or conical surface conforming to the taper of the bore 15.

The insert 16 is provided with two circular grooves 18 which are concentric with the passageways 11 and 12. Suitable O-rings 19 are mounted in these grooves 18 so as to maintain a seal between the bore 15 and the insert 16. The arrangement is such that there is an annular land 20 on each side of the insert 16 concentric with the passageways 11 and 12. These lands 20 may be referred to as the areas which, when subjected to pressure, tend to deform the insert. For example, assuming that the passageway 11 is the inlet of the valve, the land 20 at the left of Figure 1 is subjected to the pressure of the fluid in the passageway 11 when the valve is closed as shown in Figure 1. Due partly to resiliency of the insert 16 and due partly to the reduced sectional area at groove 18, the lands 20 are supported to the remainder of insert 16 with some flexibility. Upon the inlet land 20 being subjected to fluid pressure, said pressure is transmitted to a like area of the interior cylindrical surface of the insert bore 23. The pressure, when applied, is in addition to that imposed by cap 17. Also of note is that the O-rings 19 obviate the need for a lapped contact surface between the insert 16 and the bore 15.

Figure 2:
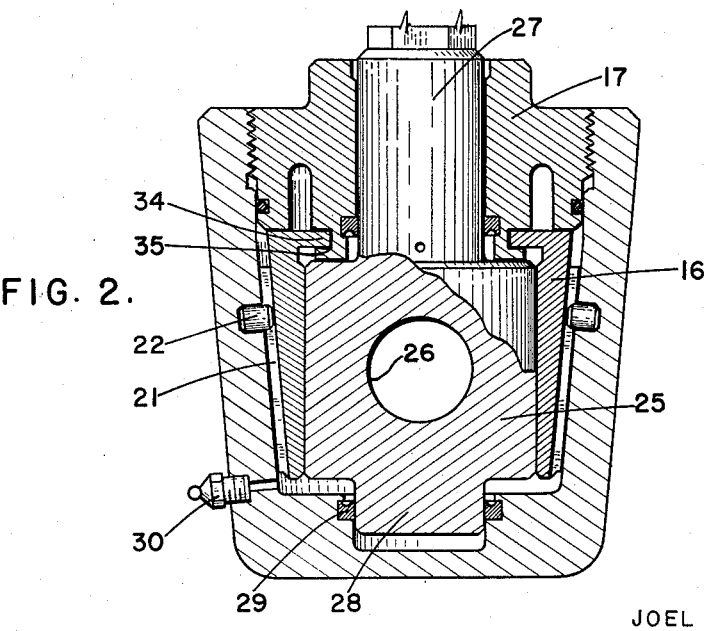
Figure 2 is a vertical cross-sectional view taken along the line 2—2 of Figure 1, the view being taken at right angles to the showing in Figure 1.

The insert 16 is held against rotation within the valve body at all times. The means for holding it against rotation may be of any suitable form. In the arrangement illustrated in Figure 2, grooves are provided on the insert as shown at 21 and suitable pins 22 are mounted in the valve body 10 and these project into the grooves 21.

The plug 25 has cylindrical projections 27 and 28 thereon for mounting it in the valve body 10 and in the cap 17 as illustrated. Suitable packing is provided as shown at 29 to prevent leakage through the valve body and cap and the spaces between the plug 25 and the packing 29 may be suitably lubricated. A fitting 30 is shown for supplying lubricant to these passages.

To rotate the valve to the open position, means 31 is provided.

A passageway 32 is provided in the projection 27 to fill the void spaces in the valve body with grease or the like, and the top of the projection 27 may be provided with a fitting 33.

In accordance with the present invention, the insert 16 is provided with an inwardly extending flange 34. This is fitted into a groove in the lower end of the cap 17.

Because of this swivel coupling between the insert 16 and the cap 17, the downward force exerted upon the insert due to the differential pressure in the voids of the valve body as the result of the taper of the insert will be transmitted to the cap 17. Accordingly there will be no downward force transmitted to the plug 25.

By merely rotating the cap 17 in the valve body 10, the vertical position of the insert can be adjusted, without interfering with the horizontal movement of the insert.

When the valve is assembled and ready for use, the cap 17 is adjusted so as to cause it to exert some downward force upon the insert 16 to force the insert downwardly and snugly fit between the valve body 10 and the plug 25. This adjustment is made, of course, before the void spaces in the valve body 10 are subjected to high fluid pressure.

When in use, as fluid enters the void spaces in the body 10, additional downward pressure is exerted on the insert 16, but the insert 16 cannot move downward to any material extent due to the swivel coupling between the insert 16 and the cap 17, as explained above.

We claim:

1. A plug valve comprising a valve body having inlet and outlet passageways and a tapered bore transversely disposed with respect to said passageways, a tapered insert disposed in said tapered bore and adapted to be reduced in diameter, said insert having a flange at its base, ports in registry with said passageways and a cylindrical bore transversely disposed with respect to said ports, said insert also having a groove surrounding said body inlet passageway to provide an annular land also surrounding said inlet passageway, said land being in pressurable communication with said inlet passageway, sealing means in said groove, means common to said insert and said body to permit only longitudinal motion therebetween, a cylindrical plug rotatably mounted in said cylindrical bore of said insert, and having a passageway therein adapted to be selectively registered with said ports, a cap adjustably mounted in said valve body and a swivel connection between said insert and said cap, whereby the vertical position of said insert can be regulated by adjusting said cap but fluid pressure in the void spaces in said valve body cannot materially move the insert downwardly.

2. The plug valve defined in claim 1 in which the swivel connection between said insert and said cap includes a groove in said cap in which the flange on said insert is fitted.

References Cited in the file of this patent

UNITED STATES PATENTS

| | | |
|---|---|---|
| 2,713,987 | Schenck | July 26, 1955 |
| 2,776,104 | Sinkler | Jan. 1, 1957 |